United States Patent
Kojima

[11] Patent Number: 6,118,613
[45] Date of Patent: Sep. 12, 2000

[54] ELECTROMAGNETIC ACTUATOR DRIVE CIRCUIT

[75] Inventor: Masanori Kojima, Tokyo, Japan

[73] Assignee: Mitsubishi Denki Kabushiki Kaisha, Tokyo, Japan

[21] Appl. No.: 08/787,960

[22] Filed: Jan. 23, 1997

[30] Foreign Application Priority Data

Jan. 26, 1996 [JP] Japan .................................. 8-011716

[51] Int. Cl.[7] ...................................................... G11B 5/55
[52] U.S. Cl. ........................ 360/75; 360/77.16; 360/78.12
[58] Field of Search ............................. 360/77.16, 78.05, 360/77.12; 318/560, 561, 508, 511, 615, 687, 135, 805, 608, 609

[56] References Cited

U.S. PATENT DOCUMENTS

| | | | |
|---|---|---|---|
| 4,350,964 | 9/1982 | Chambers | 333/213 |
| 4,471,278 | 9/1984 | Matouka | 318/561 |
| 4,970,611 | 11/1990 | Kodama et al. | 360/77.16 |
| 5,001,770 | 3/1991 | Losic et al. | 360/812 X |
| 5,327,308 | 7/1994 | Hanson | 360/97.01 |
| 5,499,143 | 3/1996 | Sakamoto et al. | 359/824 |
| 5,566,369 | 10/1996 | Carobolante | 360/75 |

OTHER PUBLICATIONS

Dynamic Tracking System Using Moving Coil Actuators for a Consumer VCR, Masanori Kojima et al, 009 3063/94 1994 IEEE, pp. 969–975.

G. Fraser; Velocity Profile Compensator; IBM tech Disclosure Bulletin; vol. 18, #9, p. 3054, Feb. 1976.

*Primary Examiner*—Paul Loomis
*Assistant Examiner*—K. Wong

[57] ABSTRACT

An electromagnetic actuator drive circuit suppresses mechanical resonance which occurs in a magnetic head or an optical device whose position is controlled and giving a very small displacement to an electromagnetic actuator. By feeding back the terminal voltage E of the electromagnetic actuator to the signal current $I_s$ of the electromagnetic actuator through a feedback circuit, a Q factor in the case where short-circuit control is performed by voltage drive is realized so as to be about 0.5 which is the size of critical damping. The actuator drive circuit is applied for improving the picture quality reproduced by a video tape recorder, a projection image display, or the like and is capable of enhancing the ability to damp a moving object such as a magnetic head by performing short-circuit control by voltage drive.

11 Claims, 12 Drawing Sheets

ELECTROMAGNETIC ACTUATOR DRIVE CIRCUIT

BACKGROUND OF THE INVENTION

This invention relates to a drive circuit for giving a very small or fine displacement to an electromagnetic actuator in accordance with a signal from a signal source, while suppressing mechanical resonance. The electromagnetic actuator drive circuit of the invention can be used for driving an electromagnetic actuator used for driving a magnetic head In a video tape recorder or an optical device in a projection image display.

In order to supply an electrical drive signal to the electromagnetic actuator and control, for example, the movement of the magnetic head of a video tape recorder so that the magnetic head can accurately trace the recorded locus of a magnetic tape, there has been considered a damping method of suppressing the mechanical vibration of an actuator by a drive circuit. There is a conventional actuator drive circuit disclosed in Japan Laid-Open Patent Publication No. 64-62813 or in the corresponding U.S. Pat. No. 4,970,611. In another conventional drive circuit, which is described in "Dynamic Tracking System Using Moving Coil Actuators for a Consumer VCR" (IEEE Trans. on Cons., Elec., Vol. 40, No. 4, pp. 969–975, Nov., 1994), there is described a moving-coil type actuator where the video frame frequency is, for example, 30 Hz. In the case of a moving-coil type actuator, with its coil resistance being 31 Ω, and the current-to-displacement conversion sensitivity or gain being 2.1 μm/mA, when the mechanical resonant frequency of the moving part is about 320 Hz, the mechanical vibration can be damped with a Q factor of 4.6 at resonance, if the Q factor is 440 in the current drive of the actuator.

FIG. 15 is a circuit diagram showing an equivalent circuit of an electromagnetic actuator device. In the figure, reference numeral 100 indicates the drive circuit of an actuator 1, reference numeral 2 a resistor equivalent to the resistance value $R_c$ of an electromagnetic coil which constitutes the actuator 1, reference numeral 3 a power supply equivalent to an electromotive force $E_a$ induced in the coil, and reference numeral 4 a magnet placed in the magnetic field that the coil forms. Reference numeral 50 represents an electrical resistance equivalent to a mechanical damping resistance, which has an electrical resistance value $R_a$. By applying a terminal voltage E and a terminal current I from the drive circuit 100 to the actuator 1, as the drive signal, a desired relative displacement can be given to the actuator 1 (coil) or the magnet 4. However, in order to accurately control the displacement, there is the need to precisely damp the mechanical vibration of the actuator 1 or the magnet 4.

Based on the equivalent circuit diagram, the damping and movement (displacement) of the actuator 1 will hereinafter be examined.

Eq. 1 represents the Laplace transformation of the equation of motion of the actuator 1.

$$\frac{s^2 Y}{\omega_a^2} + \frac{sY}{\omega_a Q_a} + Y = GI \tag{1}$$

where $\omega_a$ is the mechanical resonant frequency of the moving part of the actuator 1, $Q_a$ is the Q factor of mechanical resonance, G is the current-to-displacement conversion sensitivity of the actuator 1, Y is the displacement of mechanical vibration, and s is the Laplace operator. If the actuator 1 is current-driven, damping is effected with the Q factor which is now equal to $Q_a$, On the other hand, the relation between the voltage E and the current I of the actuator 1 is expressed by the following Eq. 2:

$$I = \frac{E - E_a}{R_c} \tag{2}$$

Also, if the magnetic flux near the coil is represented by B and the length of the coil is represented by L, the electromotive force $E_a$ induced in the coil becomes as follows.

$$E_a = sYBL \tag{3}$$

Therefore, the equation of motion of Eq. 1 can be rewritten as the following Eq. 4 by Eqs. 2 and 3.

$$\frac{s^2 Y}{\omega_a^2} + \frac{sY}{\omega_a Q_a} + Y = \frac{GE}{R_c} - \frac{sYGBL}{R_c} \tag{4}$$

When the electromagnetic actuator 1 is voltage-driven at an applied voltage E, the electromotive force $E_a$ is induced in the coil. This electromotive force $E_a$ is fed back to the drive circuit 100, and a damping current $E_a/R_c$ (=sYBL/$R_c$), which is equivalent to the electromotive force $E_a$ short-circuited by the resistance value $R_c$ of the coil, is produced, whereby a damping force is produced in the electromagnetic actuator 1 by the voltage drive of the actuator 1. The second term on the right-hand side of Eq. 4 indicates the short-circuit damping term, which also becomes the mechanical damping term of speed feedback. Then, the short-circuit damping is replaced with the mechanical damping to obtain the Q factor of the short-circuit damping.

That is, because $R_c$ acts as an electric damping resistor, the short-circuit damping term of the electromagnetic actuator 1 of the second term on the right-hand side of Eq. 4 is transposed to the left-hand side and compared with the mechanical damping term on the left-hand side of Eq. 4. With this, the Q factor $Q_c$ caused by the voltage drive of the actuator 1 is obtained from the following Eq. 5.

$$\omega_a Q_c = \frac{R_c}{GBL} \tag{5}$$

Next, the mechanical damping term of the second term on the left-hand side of Eq. 4 is replaced with the form of the short-circuit damping term and the electrical resistance value in the equivalent circuit of FIG. 15 is obtained.

First, if the numerator and denominator of the mechanical damping term is multiplied by GBL, Eq. 6 is obtained.

$$\frac{sY}{\omega_a Q_a} = \frac{sYGBL}{GBL\omega_a Q_a} \tag{6}$$

Thus, by rewriting the damping of the mechanical vibration to sYGBL/$R_a$, the actuator can be regarded as undergoing electric damping at the electrical resistance value $R_a$. Therefore, the electrical resistance value $R_a$ can be expressed by $Q_a$ which is the Q factor of the mechanical resonance, as follows.

$$R_a = GBL\omega_a Q_a \tag{7}$$

Referring to this Eq. 7 and the aforementioned Eq. 3, the (numerator/denominator) on the right-hand side of the aforementioned Eq. 6 is represented by $E_a/R_a$. Therefore, in the equivalent circuit of FIG. 15, the resistor 50 is disposed in parallel with the electromotive force 3.

Also, from Eqs. 5 and 7 the relation of the following Eq. 8 is obtained for the Q factor $Q_c$ in the voltage drive of the electromagnetic actuator 1.

$$Q_c = \frac{Q_a R_c}{R_a} \quad (8)$$

The aforementioned Eq. 8 indicates that when the electromotive force $E_a$ is fed back, the damping resistance is established by not only $R_c$ but also an arbitrary damping resistance value.

FIG. 16 is a circuit diagram showing an example of a conventional actuator drive circuit.

A signal source 5 in a drive circuit 100 generates a signal voltage $E_s$, which is input to the negative input terminal of an operational amplifier 7 through an input resistor 6 of resistance value $R_1$. The positive input terminal of the operational amplifier 7 is connected to ground. The output of the operational amplifier 7 is applied to an actuator 1 through a current detecting resistor 8 of resistance value R. The voltage across the opposite ends of the resistor 8 is amplified by a differential amplifier 9 of amplification degree A, and consequently, the terminal current I of the actuator 1 is fed back to the operational amplifier 7 through a feedback resistor 10 of resistance value $R_F$ and a resistor 11 of resistance value $R_2$. In this way, current feedback is performed. In addition, the terminal voltage E of the actuator 1 is fed back to the operational amplifier 7 through a capacitor 12 of voltage feedback capacitance $C_F$ and the resistor 11. In this way, voltage feedback is performed.

With the aforementioned arrangement, the actuator 1 gives a very small displacement Y, which is proportional to the signal voltage $E_s$, to a magnetic head (which is a controlled object) through the magnet 4 of FIG. 15.

The operation of the drive circuit 100 will be examined.

The current I of the actuator 1 gives rise to voltage drop across the current detecting resistor 8. The voltage drop is amplified by the differential amplifier 9 of amplification degree A, and the output of the differential amplifier 9 is negatively fed back to the operational amplifier 7 through the resistors 10 and 11.

When the frequency of the signal voltage $E_s$ of the signal source 5 is low, the capacitor 12 can be considered open. Also, if the resistance value $R_F$ of the resistor 10 is selected to a value which is negligible in comparison with the resistance value $R_2$ of the resistor 11, the following Eq. 9 is obtained.

$$I = -\frac{E_s R_2}{A R_1 R} \quad (9)$$

Thus, when the signal frequency of the signal source 5 is low, the drive circuit of FIG. 16 current-drives the actuator 1 and has such a characteristic that the voltage-to-displacement conversion sensitivity (gain) Y of the displacement Y relative to the signal voltage $E_s$ of the input signal is not influenced by the resistance value $R_c$ of the electromagnetic coil of the actuator 1.

When, on the other hand, the signal frequency of the signal source 5 is high, the capacitor 12 can be considered to be short-circuited, and the terminal voltage E of the actuator 1 is negatively fed back to the operational amplifier 7 through the resistor 11 of resistance value $R_2$. The actuator 1, therefore, is driven by the terminal voltage expressed with the following Eq. 10.

$$E = -\frac{E_s R_2}{R_1} \quad (10)$$

That is, the actuator 1 is voltage-driven by the negative feedback of the terminal voltage E and, as described above, the Q factor $Q_c$ of the mechanical resonance is reduced to 4.6.

Thus, if current is caused to flow through the electromagnetic actuator 1 to give a desired displacement to a controlled object such as a magnetic head, mechanical vibration will accompany. Damping this vibration is of importance for obtaining a desired displacement and it is possible to perform the damping operation by the drive circuit 100.

However, in order to realize satisfactory tracking and damping operations of a controlled object, a butterworth filter characteristic wherein the Q factor is 0.7 is desirable. In addition, in order to eliminate vibration completely, there has to be realized a critical-damping drive circuit where the Q factor is 0.5. However, in the conventional drive circuit when short-circuit damping is performed by the voltage drive of the actuator, the Q factor which can be realized is only about 4.6 which is about ten times as large as the critical damping.

SUMMARY OF THE INVENTION

It is accordingly an object of the present invention to provide an electromagnetic actuator drive circuit which is capable of realizing a Q factor of 0.5 and enhancing a damping ability by an improvement to a feedback circuit.

Another object of the present invention is to provide an electromagnetic actuator for giving a very small or fine displacement to a controlled object and a video tape recorder and a projection image display which use the electromagnetic actuator.

In accordance with one aspect of the present invention, there is provided an electromagnetic actuator drive circuit for controlling a drive current of an electromagnetic actuator in accordance with a signal from a signal source, a displacement of said electromagnetic actuator being displaced in accordance with the drive current, said drive circuit comprising:

a drive-current control circuit for controlling the drive current of said electromagnetic actuator in accordance with said signal from said signal source; and a feedback controller means for controlling said drive current by negative feedback of a terminal voltage of said electromagnetic actuator and by positive feedback of a terminal current of said electromagnetic actuator.

With the above configuration, the electromagnetic actuator is current driven and the terminal voltage of the electromagnetic actuator is negatively fed back to the drive current. As a result, the Q factor can be reduced and a damping operation with an arbitrary Q factor is possible by appropriately selecting the feedback quantity of the feedback circuit.

It may be so arranged that said feedback controller is set to satisfy a relation:

$$0 < (H-1) \times R_f < R_c,$$

where H represents a current-to-voltage conversion sensitivity for determining a positive feedback quantity based on said terminal current, $R_f$ represents a reciprocal of a mutual conductance for determining a negative feedback quantity based on said terminal voltage, and $R_c$ represents a resistance value of a coil of said electromagnetic actuator.

With the above configuration, damping is effected with a Q factor smaller than a Q factor in voltage drive, and oscillation due to feedback can be prevented.

It may be so arranged that said drive-current control circuit comprises a first current source whose current is determined in accordance with said signal from said signal source, and said feedback controller comprises a circuit for producing a feedback signal in accordance with said terminal voltage and said terminal current, and a second current source which is connected in parallel with said first current source, and whose current is controlled in accordance with said feedback signal.

With the above configuration, the feedback controller is formed by the current source for controlling the drive current in accordance with the terminal voltage and terminal current of the electromagnetic actuator.

It may be so arranged that said drive-current control circuit comprises a current source, and said feedback controller comprises a circuit for producing a feedback signal in accordance with said terminal voltage and said terminal current, and a circuit for controlling the current of said current source in accordance with said signal from said signal source and said feedback signal.

The above configuration is implemented with a simple structure, and hence at a relatively low cost, and yet the reliability of the drive circuit is high.

In accordance with another aspect of the invention, there is provided an electromagnetic actuator drive circuit for controlling a drive current of an electromagnetic actuator in accordance with a signal from a signal source, a displacement of said electromagnetic actuator being displaced in accordance with the drive current, the drive circuit comprising:

a drive-current control circuit for controlling the drive current of said electromagnetic actuator in accordance with said signal from said signal source; and negative resistance a circuit connected in parallel with said electromagnetic actuator.

With the above configuration, the electromagnetic actuator is shorted by the negative resistance circuit, to lower the Q factor, so that damping with an arbitrary Q value is possible by appropriately selecting the resistance value of the negative resistance circuit.

It may be so arranged that said negative resistance circuit is constructed so that an absolute value of the circuit resistance thereof is smaller than a resistance value of a coil of said electromagnetic actuator.

With the above configuration, damping with a Q factor smaller than a Q factor in voltage drive can be effected, and oscillation due to the negative resistance can be prevented.

It may be so arranged that said negative resistance circuit is comprised of an operational amplifier, a first resistance circuit connected between the negative input terminal and output terminal of said operational amplifier, a second resistance circuit connected between the positive input terminal and output terminal of said operational amplifier, and an impedance circuit having one terminal connected to the positive input terminal of said operational amplifier and the other terminal connected to ground, and a negative resistance is formed between the negative input terminal of said operational amplifier and ground.

With the above configuration, negative resistance is formed between the negative input terminal of the operational amplifier and the ground.

It may be so arranged that said negative resistance circuit has an output operating point which is controlled directly by the signal of said signal source.

With the above configuration, the power circuit for driving the electromagnetic actuator is simple, and inexpensive, and yet the reliability of the drive circuit is high.

It may be so arranged that said negative resistance circuit has a negative resistance value at a mechanical resonant frequency of a moving part of said electromagnetic actuator and also has a higher impedance than said negative resistance value at a drive frequency of said electromagnetic actuator.

With the above configuration, variation in the conversion sensitivity with respect to variation in the resistance of the coil can be reduced.

In accordance with another aspect of the invention, there is provided an electromagnetic actuator drive circuit for controlling a drive current of an electromagnetic actuator in accordance with a signal from a signal source, a displacement of said electromagnetic actuator being displaced in accordance with the drive current, the drive circuit comprising:

a drive-current control circuit for controlling the drive current of said electromagnetic actuator in accordance with said signal from said signal source; and feedback controller for controlling said drive current by positive feedback of a terminal voltage of said electromagnetic actuator.

With the above configuration, the electromagnetic actuator is current driven, and the terminal voltage of the electromagnetic actuator is positively fed back. As a result, the Q factor can be reduced, and damping with an arbitrary Q factor is possible by appropriately selecting the feedback quantity.

It may be so arranged that the said feedback controller is set to satisfy a relation:

$$0 < R_f < R_c.$$

where $R_f$ represents a reciprocal of a mutual conductance for determining a positive feedback quantity based on said terminal voltage, and $R_c$ represents a resistance value of a coil of said electromagnetic actuator.

With the above configuration, damping with a Q factor smaller than a Q factor in voltage drive can be effected by appropriately selecting the feedback quantity, and also oscillation due to feedback can be prevented.

It may be so arranged that said drive-current control circuit comprises a first current source whose current is determined in accordance with said signal from said signal source, and said feedback controller comprises a circuit for producing a feedback signal in accordance with said terminal voltage, and a second current source which is connected in parallel with said first current source, and whose current is controlled in accordance with said feedback signal.

With the above configuration, the feedback controller can be realized by the current source controlling the drive current in accordance with the terminal voltage of the electromagnetic actuator.

It may be so arranged that said drive-current control circuit comprises a current source, and said feedback controller comprises a circuit for producing a feedback signal in accordance with said terminal voltage, and means for controlling the current of said current source in accordance with said signal from said signal source and said feedback signal.

The above configuration can be implemented with a simple construction and at a low cost, and yet the reliability of the drive circuit is high.

It may be so arranged that said feedback controller has such a high-pass characteristic that a cut-off frequency thereof is lower than a mechanical resonant frequency of a moving part of said electromagnetic actuator and higher than a drive frequency of said electromagnetic actuator.

With the above configuration, variation in the conversion sensitivity with respect to the resistance of the coil can be reduced.

It may be so arranged that the coil of the electromagnetic actuator is a moving coil.

With the above configuration, a high conversion sensitivity can be obtained by enhancing the magnetic circuit.

It may be so arranged that the coil of the electromagnetic actuator is a moving magnet.

With the above configuration, the moving part of the actuator can be made light in weight, so that the response can be made quick.

It may be so arranged that said signal source is a displacement signal for a magnetic head of a video tape recorder, and a position of the head is controlled by said electromagnetic actuator.

When the drive circuit of the electromagnetic actuator of the present invention is applied to a video tape recorder as described above, high-speed playback can be realized without noise.

It may be so arranged that said signal source is an angular displacement signal for a transparent plate disposed in front of a liquid crystal panel, and a position of the transparent plate is controlled by said electromagnetic actuator.

When the drive circuit of the electromagnetic actuator of the present invention is used in a projection image display as described above, the electromagnetic actuator can be used as a vertical auxiliary deflection of the image display, to visually double the number of horizontal scanning lines by sequentially shifting a light beam in the vertical direction.

These and other objects of the invention will become more apparent from the detailed description and examples which follow.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

DETAILED DESCRIPTION OF THE PREFERRED EMBODIMENTS

First Embodiment

Figure 1:
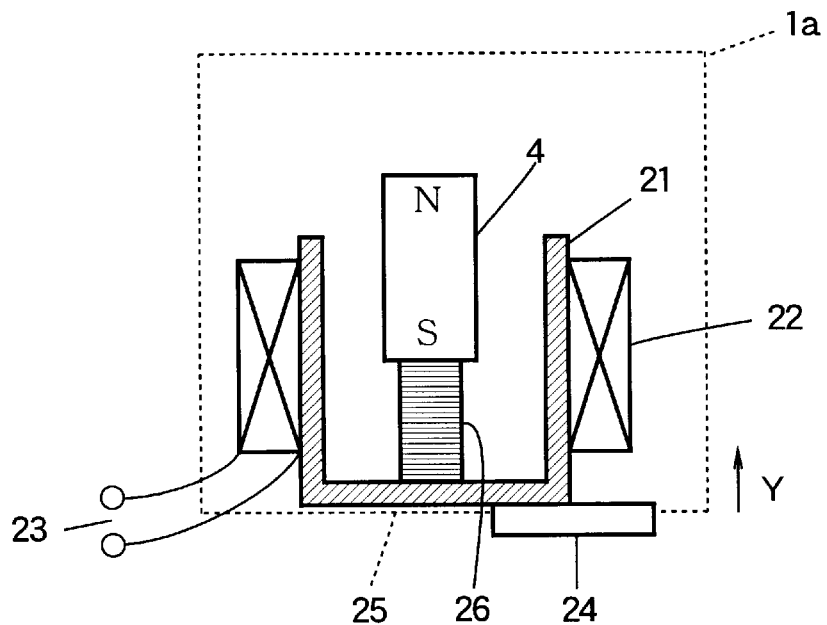
FIG. 1 is a sectional schematic view showing a moving-coil type electromagnetic actuator.

FIG. 1 is a sectional schematic view showing a moving-coil type electromagnetic actuator. In the figure, reference numeral 21 denotes a cylindrical bottomed bobbin, on which a coil 22 is wound. Reference numeral 23 denotes terminals of the coil 22. Reference numeral 24 denotes a head which is a controlled object, and the head 24 is bonded to the outer bottom surface 25 of the bobbin 21. Reference numeral 26 is a cylindrical spring.

In this moving-coil type electromagnetic actuator 1a, one end of the spring 26 is firmly attached to the inner bottom surface of the bobbin 21 and the other end is bonded to one pole (south pole) of the magnet 4. If current flows through the coil 22 positioned in the magnetic flux that the magnet 4 generates, an electromagnetic force will be generated between the coil 22 and the magnet 4. Therefore, if the other pole (north pole) of the magnet 4 is fixed and a signal current flows through the coil 22, the coil 22 will be displaced together with the bobbin 21, and the head 24 attached to the outer bottom surface of the bobbin 21 will be displaced in the vertical direction of FIG. 1. This displacement is indicated as an arrow Y.

Figure 2:
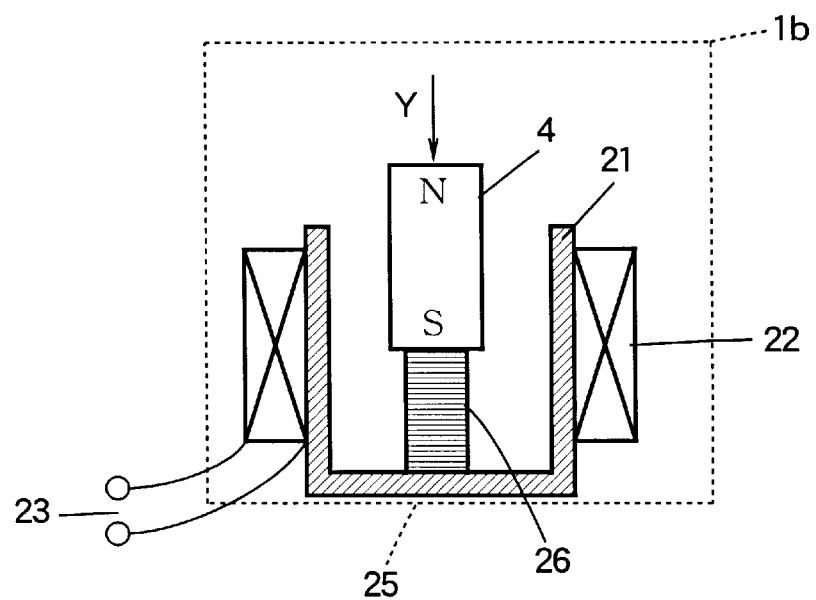
FIG. 2 is a sectional schematic view showing a moving-magnet type electromagnetic actuator.

FIG. 2 is a sectional schematic view showing a moving-magnet type electromagnetic actuator. In the moving-magnet type electromagnetic actuator 1b, the outer bottom surface 25 of a bobbin 21 is a fixed end. Also, one end (south pole) of a magnet 4 is firmly attached through a spring 26 to the inner bottom surface of a bobbin 21 and the other pole (north pole) is a moving end. Other structure and operations are identical with the moving-coil type electromagnetic actuator 1a of FIG. 1.

Figure 3:
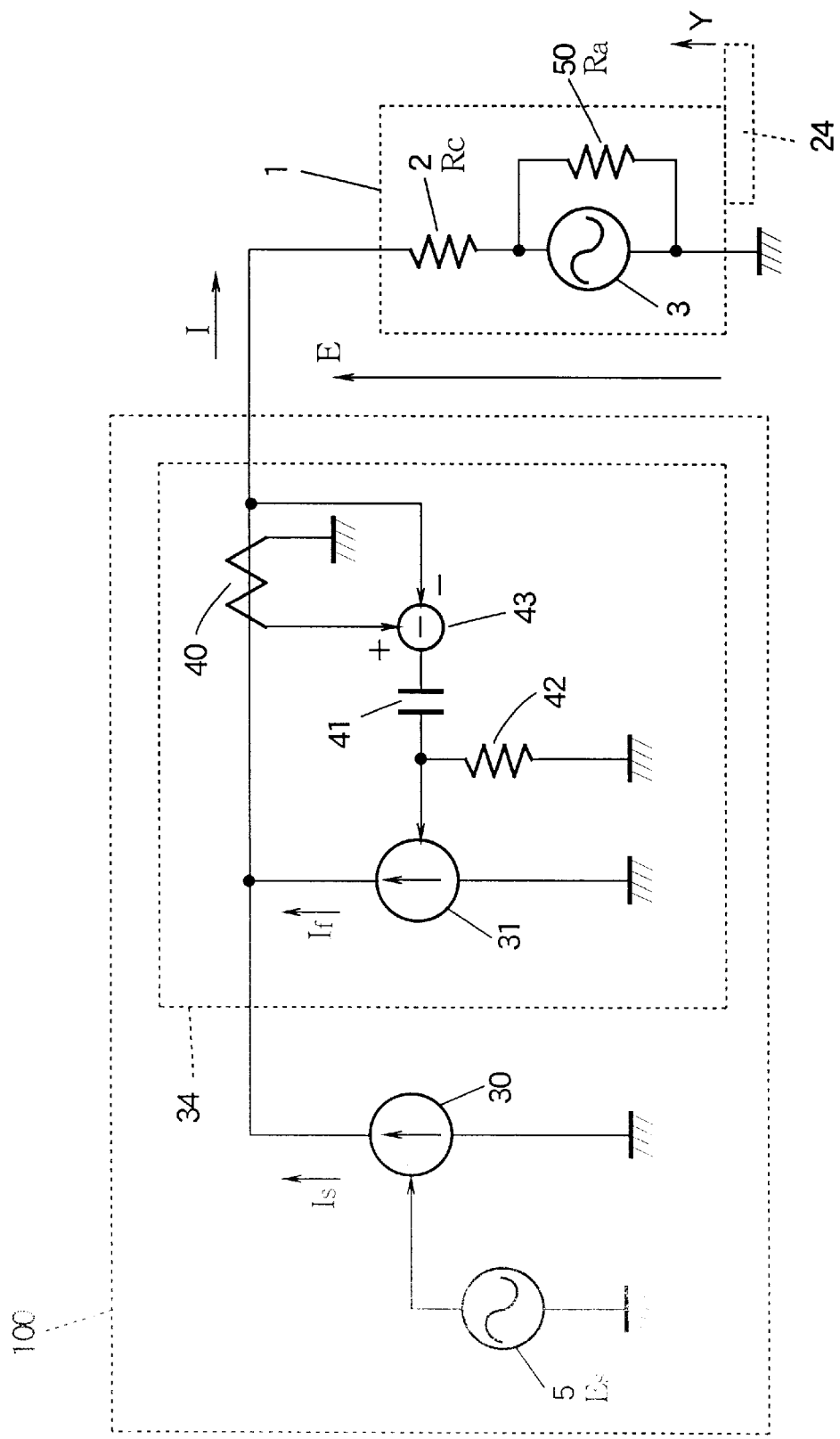
FIG. 3 is a drive circuit diagram of an electromagnetic actuator of a first embodiment of the present invention.

FIG. 3 shows a drive circuit of an electromagnetic actuator of a first embodiment of the present invention. In the figure, reference numeral 30 denotes a current source which constitutes a drive-current control circuit. The output of the current source 30 is controlled by the signal voltage $E_s$ of the signal source 5 and is supplied to an actuator 1 as a signal current $I_s$. Reference numeral 40 denotes a current detector, which produces a voltage value indicative of the current value of a terminal current I, which is supplied to the actuator 1. Reference numerals 41 and 42 denote a capacitor and a resistor, which form a high-pass filter. Reference numeral 43 denotes a signal synthesizer, which subtracts the terminal voltage E of the actuator 1 from the voltage value converted by the current detector 40. The result of the subtraction is input to a current source 31 through the high-pass filter which consists of the capacitor 41 and the resistor 42. With this, the result of subtraction from the signal synthesizer 43 is converted to a feedback signal in the form of a current value $I_f$, which is added to the signal current $I_s$. The resultant signal is fed back as the terminal signal I of the actuator 1.

That is, the drive circuit 100 is provided with a single feedback circuit 34. In the feedback circuit 34 the feedback quantity of the voltage feedback is determined by the mutual conductance of the current source 31, and the conductance is given by $1/R_f$, where $R_f$ is the internal impedance of the current source 31. Also, the feedback quantity of the current feedback of the feedback circuit 34 is determined by the product of the conversion sensitivity or gain H of the current detector 40 and the reciprocal $R_f$ of the mutual conductance of the current source 31. The damping operation of the drive circuit of the electromagnetic actuator of FIG. 3 will hereinafter be described with the assumption that the current feedback quantity is $HR_f$.

When the frequency of the signal voltage $E_s$ of the signal source 5 is sufficiently lower than the cut-off frequency of the high-pass filter of the feedback circuit 34, the capacitor 41 can be considered open. Hence, the feedback circuit 34 of the drive circuit 100 is not operated and the actuator 1 is basically current-driven by only the signal current $I_s$ from the current source 30. Therefore, as with the conventional device, the current-to-displacement conversion sensitivity is not influenced by the resistance value $R_c$ of the coil 2.

When the mechanical resonant frequency of the actuator 1 is sufficiently higher than the cut-off frequency of the high-pass filter of the feedback circuit 34, the capacitor 41 can be considered to be short-circuited. Therefore, the feedback loop is formed by the feedback circuit 34 and there is the need to consider the damping operation due to the feedback circuit 34. The current value I of the actuator 1 is expressed by the following Eq. 11.

$$I = I_s + I_f = I_s + HI - \frac{E}{R_f} \qquad (11)$$

Furthermore, from Eqs. 11 and 2 the current value I of the actuator 1 will become as the following Eq. 12, if it is expressed by the signal current $I_s$ and the electromotive force $E_a$ induced in the coil.

$$I = \frac{I_s}{\frac{R_c}{R_f} - H + 1} - \frac{E_a}{R_c - (H-1)R_f} \qquad (12)$$

In Eq. 12 the two terms on the right-hand side indicate that the current, caused by the electromotive force $E_a$, has been fed back to the signal current $I_s$. The second term on the right-hand side determines a speed feedback quantity, and functions as short-circuit damping. The denominator of the second term, $R_c-(H-1)R_f$, is the resistance component of the short-circuit damping. Therefore, in the same way as that in which the Q factor is obtained by Eq. 8 in the voltage drive, the Q factor in the speed feedback in the feedback circuit 34 is obtained by the following Eq. 13.

$$Q_f = \frac{Q_a\{R_c - (H-1)R_f\}}{R_a} \qquad (13)$$

Therefore, if a speed feedback quantity is determined by selecting a value of $(H-1)R_f$, the damping of the electromagnetic actuator with an arbitrary Q factor can be realized. More specifically, if the value of $(H-1)R_f$ is made greater than zero, a Q factor smaller than at least the $Q_c$ of Eq. 8 can be realized. In an example, where the resistance value $R_a$ of the electromagnetic-actuator 1 is 3.0 k Ω, critical damping is realized by setting a value of $(H-1)R_f$ to 27.6. Thus, by damping in voltage feedback by negative feedback, a Q factor smaller than prior art can be obtained.

However, if the Q factor becomes negative, the electromagnetic actuator 1 will oscillate. This oscillation can be prevented by setting the value of $(H-1)R_f$ to a value smaller than the resistance value $R_c$ of the coil, i.e., $(H-1)R_f<R_c$.

Where a high-pass filter is not used, the operation of the drive circuit at low frequencies is also performed with Eq. 12. In this case the current value I of the actuator 1 is varied by $R_c$, so the conversion sensitivity H also varies. In the case where this variation is negligible, the damping effect is obtainable, as is the aforementioned case where the high-pass filter is used.

In addition, where the moving-coil type electromagnetic actuator of FIG. 1 is used as the electromagnetic actuator 1, it is possible to enhance the magnetic circuit by using a thick magnet or disposing a yoke around the outer periphery of the coil 22. Thus, the magnetic flux density can be increased and a high signal source voltage-to-displacement conversion sensitivity is obtainable.

Furthermore, where the moving-magnet type electromagnetic actuator of FIG. 2 is used as the electromagnetic actuator 1, the moving part, i.e., the magnet 4, can be so constructed as to be small and light in weight in comparison with the coil, so the response to signal voltage is quicker.

Second Embodiment

Figure 4:
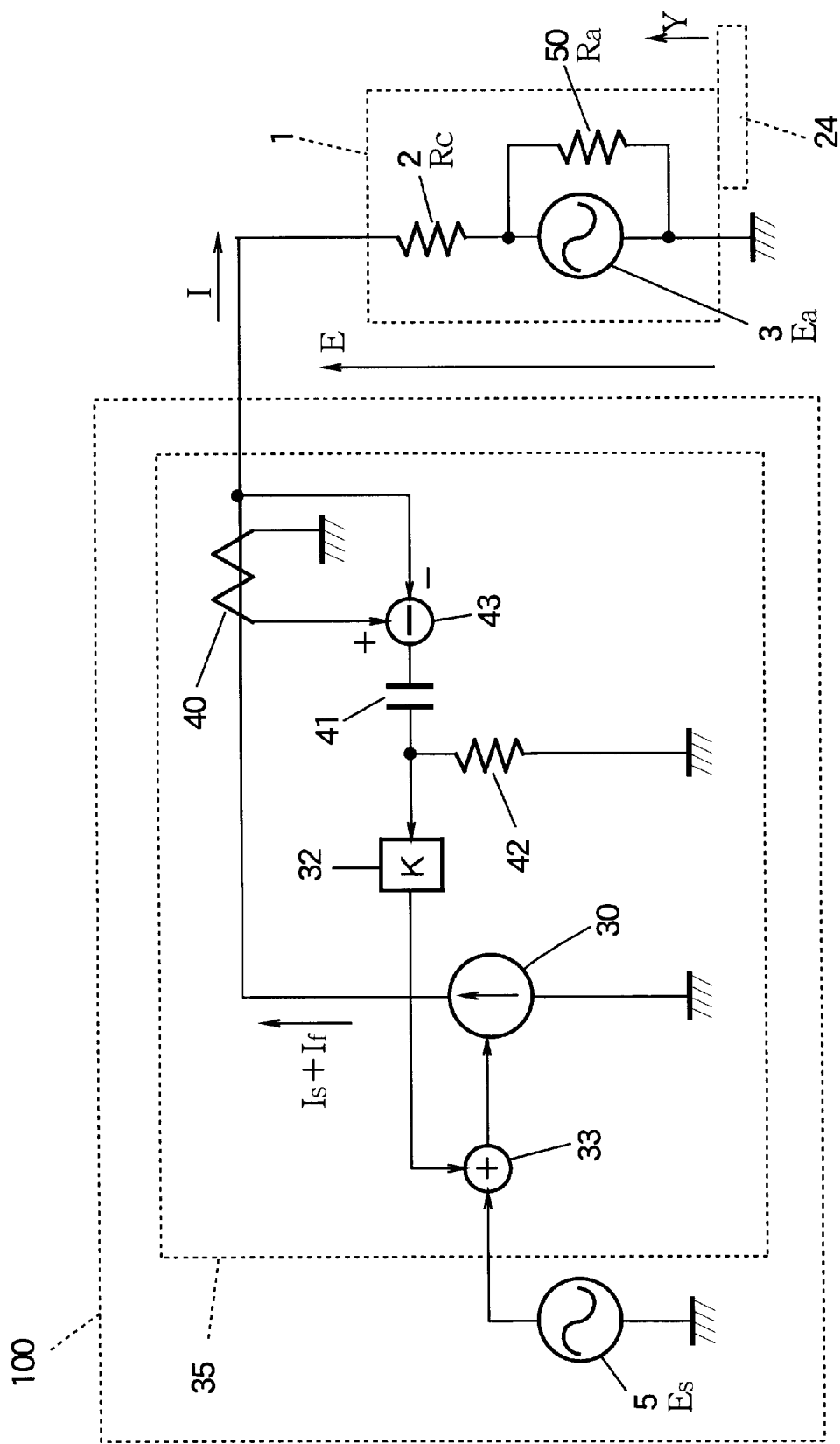
FIG. 4 is a drive circuit diagram of an electromagnetic actuator of a second embodiment of the present invention.

FIG. 4 is a circuit diagram of a second embodiment of the present invention. The illustrated drive circuit has only one current source 30 and therefore is different from the drive circuit of FIG. 3 where the current source 31 is employed in the feedback circuit 34. More specifically, the output voltage of a high-pass filter, which consists of a capacitor 41 and a resistor 42, is multiplied by a factor K in amplitude by a coefficient multiplier 32, and the resultant voltage is added to the signal voltage $E_s$ of the signal source 5 at an adder 33. The result of this addition is input to a current source 30 so as to control the current from the current source 30, to be the sum of the current value $I_f$ of feedback signal and the signal current $I_s$.

If it is assumed that the mutual conductance of the current source 30 is $K/R_f$, the terminal current I of the electromagnetic actuator 1 which is controlled by the feedback circuit 35 is also expressed by the aforementioned Eq. 11, so it follows that the same advantageous effect as the drive circuit of FIG. 3 is attainable. The coefficient multiplier 32 will become unnecessary if K is set to 1 and, as compared with the drive circuit of FIG. 3, the current source 31 is also unnecessary, so the structure is simple. Therefore, the drive circuit of the electromagnetic actuator in this embodiment can be constructed so that it is both inexpensive and highly reliable.

Third Embodiment

Figure 5:
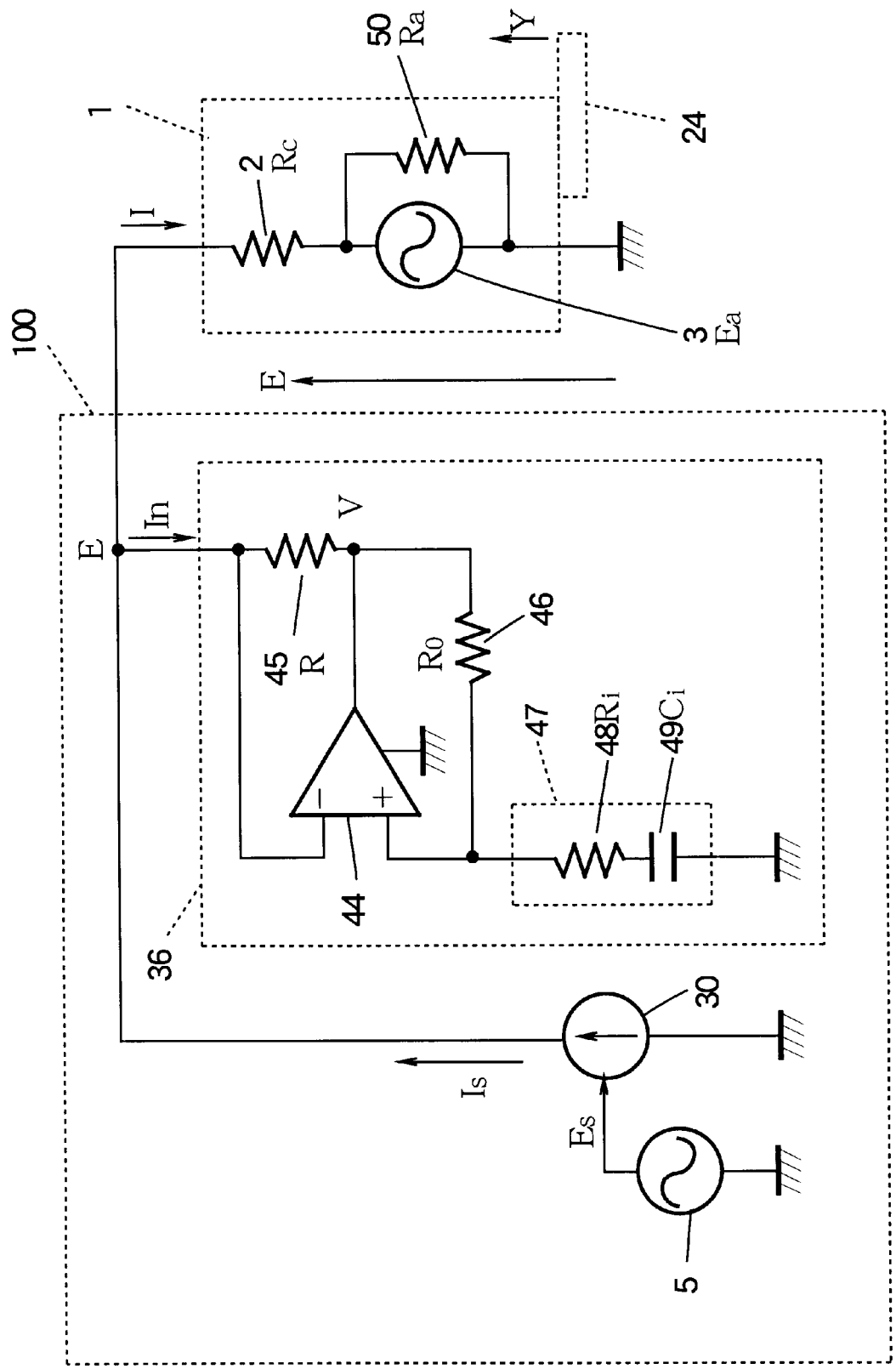
FIG. 5 is a drive circuit diagram of an electromagnetic actuator of a third embodiment of the present invention.

FIG. 5 shows a drive circuit of an electromagnetic actuator of a third embodiment of the present invention. As with the aforementioned first embodiment, the output of a current source 30 is controlled by the signal voltage $E_s$ of a signal source 5 and is supplied to an actuator 1 as a signal current $I_s$. Reference numeral 36 denotes a negative resistance circuit, which is constituted by an operational amplifier 44, a first resistor 45, a second resistor 46, and an impedance circuit 47. The impedance circuit 47 is constituted by a resistor 48 and a capacitor 49, which are connected in series.

The damping operation of the drive circuit of the electromagnetic actuator of FIG. 5 will next be described.

If the terminal current of the actuator 1 is expressed by I, the terminal voltage by E, and the resistance value of the negative resistance circuit 36 by $R_n$, the current $I_n$ flowing through the negative resistance circuit 36 is given by:

$$I_s = I + I_n = I + \frac{E}{R_n} \tag{14}$$

Furthermore, from Eqs. 14 and 2 the terminal current I will become as the following Eq. 15, if it is expressed by the signal current $I_s$ and the electromotive force $E_a$ induced in the coil.

$$I = \frac{I_s}{1 + \frac{R_c}{R_n}} - \frac{E_a}{R_c + R_n} \tag{15}$$

In Eq. 15 the two terms on the right-hand side indicate that the electromotive force E has been fed back to the signal current $I_s$. The second term on the right-hand side determines a speed feedback quantity, and this term functions as short-circuit damping. The denominator of the second term, $R_c+R_n$, is the resistance component of the short-circuit damping. Therefore, in the same way as that in which the Q factor in the voltage drive obtained by Eq. 8, the Q factor in the speed feedback in the negative resistance circuit 36 is obtained by the following Eq. 16.

$$Q_f = \frac{Q_a(R_c + R_n)}{R_a} \tag{16}$$

Therefore, by selecting the resistance value $R_n$ of the negative resistance circuit 36, the damping of the electromagnetic actuator with an arbitrary Q factor can be realized. That is, if the resistance value $R_n$ is selected so as to be negative, a Q factor smaller than at least the conventional $Q_3$ factor given by Eq. 8 can be realized.

Next, the operation of the negative resistance circuit 36 will be described. Here, assume that the resistance value of the resistor 45 is R, the resistance value of the resistor 46 is $R_o$, the resistance value of the resistor 48 is $R_i$, the capacitance value of the capacitor 49 is $C_i$, the output voltage of the operational amplifier 44 is V, and the current flowing through the negative resistance circuit 36 is $I_n$.

When the frequency of the signal voltage $E_s$ of the signal source 5 is sufficiently lower than the cut-off frequency which is determined by the $R_i$ and $C_i$ of the impedance circuit 47, the capacitor 49 can be considered open. Hence, current does not flow through the resistor 46, and since the input impedance of the operational amplifier 44 is large, there is no voltage drop across the resistor 45 and $I_n$ is zero, so the electromagnetic actuator 1 is current-driven by only the signal current $I_s$ from the current source 30. Therefore, as with the conventional device, the current-to-displacement conversion sensitivity is not influenced by the resistance value $R_c$ of the coil 2.

When the mechanical resonant frequency of the actuator 1 is sufficiently higher than the cut-off frequency which is determined by the $R_i$ and $C_i$ of the impedance circuit 47, the capacitor 49 can be considered to be short-circuited. The following Eqs. 17 and 18 are established for the current value $I_n$ of the negative resistance circuit 36.

$$I_n R = -\frac{V R_o}{R_o + R_i} \tag{17}$$

$$I_n R = E - V \tag{18}$$

Therefore, the resistance value $R_n$ of the negative resistance circuit 36 is given by the following Eq. 19.

$$R_n = \frac{E}{I_n} = -\frac{R_i R}{R_o} \tag{19}$$

Therefore, the resistance value $R_i$ of the resistor 48 of the impedance circuit 47 is converted to a negative resistance value by the coefficient $R/R_o$. Furthermore, if this is applied to Eq. 16, a value of $(R_c+R_n)$ will be reduced and it will be found that a reduction in the Q factor will be possible. Therefore, by selecting the resistance value $R_n$ of the negative resistance circuit 36, the damping of the electromagnetic actuator 1 with an arbitrary Q factor can be realized. If the resistance value $R_n$ is selected so as to be negative, a Q factor smaller than at least the conventional $Q_c$ factor given by Eq. 8 can be realized. In an example, where the resistance value $R_a$ of the electromagnetic actuator 1 is 3.0 kΩ, and the value of $R_n$ is 27.6 Ω critical damping is realized. Thus, by executing positive voltage feedback, a Q factor smaller than prior art can be obtained.

However, if the Q factor is negative, the electromagnetic actuator 1 will oscillate. This oscillation can be prevented by setting the absolute value $|R_n|$ of the negative resistance $R_n$ to a value smaller than $R_c$, i.e., $|R_n|<R_c$.

Where the impedance circuit 47 is constituted only by the resistor 48, the operation of the drive circuit at low frequencies is also performed by Eqs. 19 and 15. In this case the current value I of the actuator 1 is varied by $R_c$, so the conversion sensitivity H also varies. In the case where this variation is negligible, the damping effect of the present invention is also obtainable.

Where the moving-coil type electromagnetic actuator of FIG. 1 is used as the electromagnetic actuator 1, it is possible to enhance the magnetic circuit by using a thick magnet or disposing a yoke around the outer periphery of the coil 22. Thus, the magnetic flux density can be increased, and a high signal source voltage to displacement conversion sensitivity is obtainable.

Where the moving-magnet type electromagnetic actuator of FIG. 2 is used as the electromagnetic actuator 1, the moving part, i.e., the magnet 4, can be so constructed as to be small and light in weight in comparison with the coil, so the response to signal voltage is quicker.

Fourth Embodiment

Figure 6:
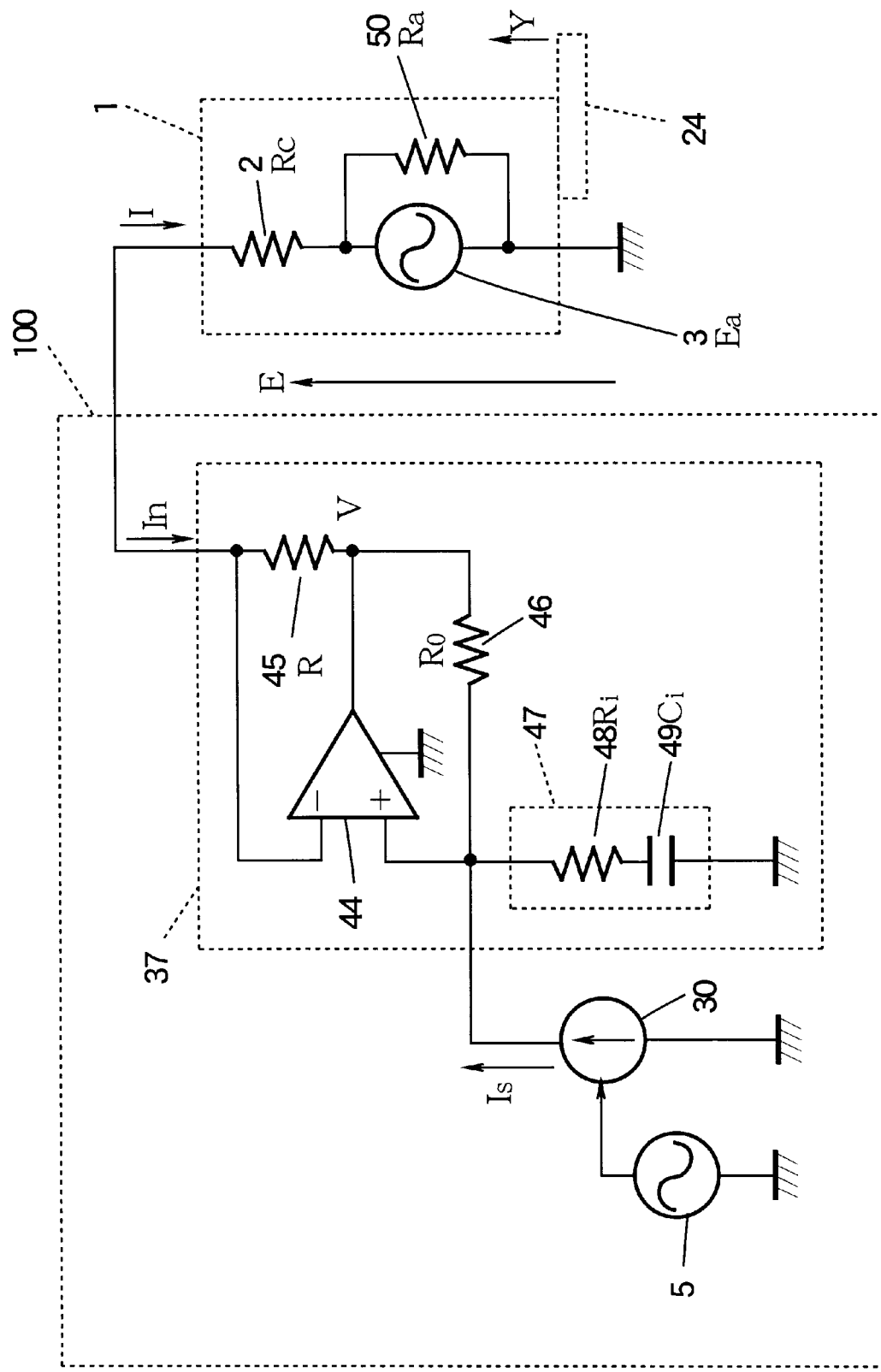
FIG. 6 is a drive circuit diagram of an electromagnetic actuator of a fourth embodiment of the present invention.

FIG. 6 is a circuit diagram of a fourth embodiment of the present invention. The drive circuit of an electromagnetic actuator in this embodiment differs from that of FIG. 5 in that the operating point of the negative resistance circuit 37 is controlled directly by a signal source 5.

When the frequency of the signal source 5 is sufficiently lower than the cut-off frequency which is determined by the resistance $R_i$ and capacitance $C_i$ of an impedance circuit 47, a capacitor 49 can be considered open, and the following Eq. 20 is established.

$$I_s R_o = I_n R = -IR \qquad (20)$$

Therefore, the terminal current I of the electromagnetic actuator 1 is expressed as $$I = -\frac{I_s R_o}{R} \qquad (21)$$

From Eq. 21 it follows that the negative resistance circuit 37 is operated as a current amplifier.

When the frequency of the signal source 5 is sufficiently higher than the cut-off frequency which is determined by the $R_i$ and $C_i$ of the impedance circuit 47, the capacitor 49 can be considered to be short-circuited. The negative resistance circuit 37 indicates the same negative resistance value as that of FIG. 5 and the Q factor of Eq. 16 can be obtained.

In the fourth embodiment, the current source 30 does not drive the electromagnetic circuit 1 directly, but through the negative resistance circuit 37, thus the signal source 5 can be made by a smaller circuit. Therefore, the drive circuit of the electromagnetic actuator in this embodiment can be constructed so that it is both inexpensive and highly reliable.

Fifth Embodiment

Figure 7:
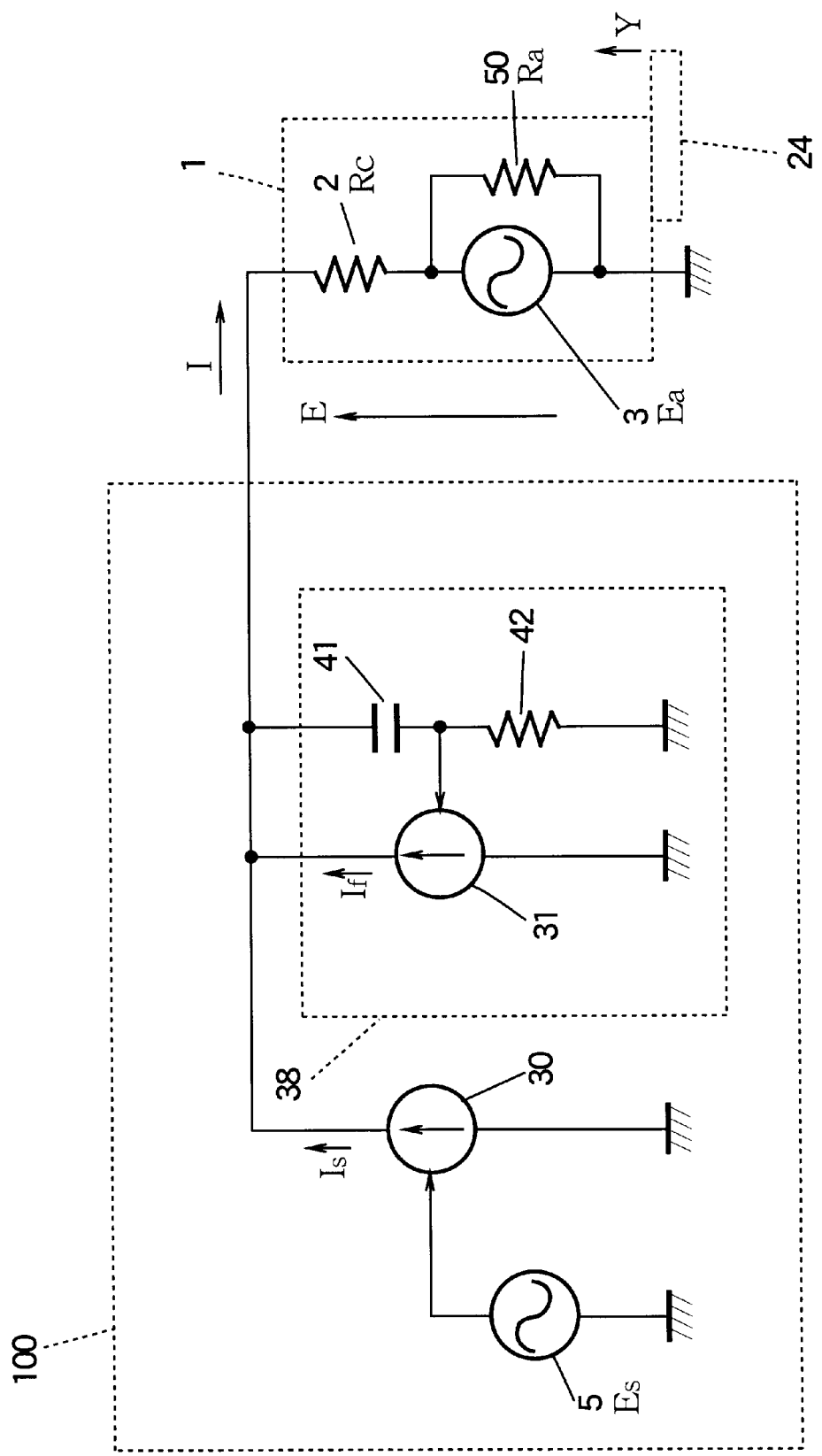
FIG. 7 is a drive circuit diagram of an electromagnetic actuator of a fifth embodiment of the present invention.

FIG. 7 shows a drive circuit of an electromagnetic actuator of a fifth embodiment of the present invention. A signal source 5 and a current source 30 for a drive circuit 100, and an electromagnetic actuator 1 are identical with those of the first embodiment. The structure of a feedback circuit 38 is different from the feedback circuit 34 of the first embodiment. More specifically, the terminal voltage E of the electromagnetic actuator 1 is converted to the current value $I_f$ of a feedback signal by the current source 31 through a high-pass filter constituted by a capacitor 41 and a resistor 42, and is positively fed back as the terminal current I of the electromagnetic actuator 1. The current feedback quantity of the feedback circuit 38 can be selected by the mutual conductance $1/R_f$ of the current source 31.

The damping operation of the drive circuit of the electromagnetic actuator of FIG. 7 will next be described.

When the frequency of the signal source 5 is sufficiently lower than the cut-off frequency of the high-pass filter of the aforementioned feedback circuit 38, the capacitor 41 can be considered open. Hence, the feedback circuit 38 of the drive circuit 100 is not operated and the electromagnetic actuator 1 is basically current-driven by only the signal current $I_s$ from the current source 30. Therefore, as with the conventional device, the current-to-displacement conversion sensitivity is not influenced by the resistance $R_c$ of the coil 2.

When the mechanical resonant frequency of the actuator 1 is sufficiently higher than the cut-off frequency of the high-pass filter of the feedback circuit 38, the capacitor 41 can be considered to be short-circuited. Therefore, the feedback loop of the feedback circuit 38 is formed and there is the need to consider the damping operation caused by the feedback. The current value I of the actuator 1 is expressed by the following Eq. 22. Here, assume that the current flowing through the capacitor 41 is negligible in comparison with the current value I of the actuator 1.

$$I = I_s + I_f = I_s + \frac{E}{R_f} \qquad (22)$$

Furthermore, from Eqs. 22 and 2 the current value I of the actuator 1 will be given by the following Eq. 23, if it is expressed by the signal current $I_s$ and the electromotive force $E_a$ induced in the coil.

$$I = \frac{I_s}{1 - \frac{R_c}{R_f}} - \frac{E_a}{R_c - R_f} \qquad (23)$$

In Eq. 23 the two terms on the right-hand side indicate that the electromotive force $E_a$ has been fed back to the signal current $I_s$. The second term on the right-hand side determines a speed feedback quantity, and functions as short-circuit damping. The denominator of the second term, $R_c - R_f$, is the resistance component of the short-circuit damping. Therefore, in the same way as that in which the Q factor in the voltage drive is obtained by Eq. 8, the Q factor in the speed feedback in the feedback circuit 38 is obtained by the following Eq. 24.

$$Q_f = \frac{Q_a(R_c - R_f)}{R_a} \qquad (24)$$

Therefore, by selecting a feedback quantity by the mutual conductance $1/R_f$ of the current source 31, the damping of the electromagnetic actuator with an arbitrary Q factor can be realized. More specifically, if the value of $R_f$ is made greater than zero, a Q factor smaller than at least the $Q_c$ given by Eq. 8 can be realized. In an example, where the resistance $R_a$ of the electromagnetic actuator 1 is 3.0 k $\Omega$, and the reciprocal ($R_f$) of the mutual conductance ($1/R_f$) is 27.6 $\Omega$, critical damping is realized. Thus, by executing damping with positive voltage feedback, a Q factor smaller than prior art can be obtained.

However, if the Q factor is negative, the electromagnetic actuator 1 will oscillate. This oscillation can be prevented by setting $R_f$, which is the reciprocal of the mutual conductance ($1/R_f$), to a value smaller than the resistance value $R_c$ of the coil, i.e., $0 < R_f < R_c$.

Where a high-pass filter is not used, the operation of the drive circuit at low frequencies is also performed by Eq. 23.

In this case the current value I of the actuator 1 is varied by $R_c$, so the displacement also varies. In the case where this variation is negligible, the damping effect of the present invention is also obtainable.

Where the moving-coil type electromagnetic actuator of FIG. 1 is used as the electromagnetic actuator 1, it is possible to enhance the magnetic circuit by using a thick magnet or disposing a yoke around the outer periphery of the coil. Thus, the magnetic flux can be increased and a high signal source voltage-to-displacement conversion sensitivity is obtainable.

Furthermore, in the case where the moving-magnet type electromagnetic actuator of FIG. 2 is used as the electromagnetic actuator 1, the moving part, i.e., the magnet 4, can be so constructed as to be small and light in weight in comparison with the coil, so the response to signal voltage is quicker.

Sixth Embodiment

Figure 8:
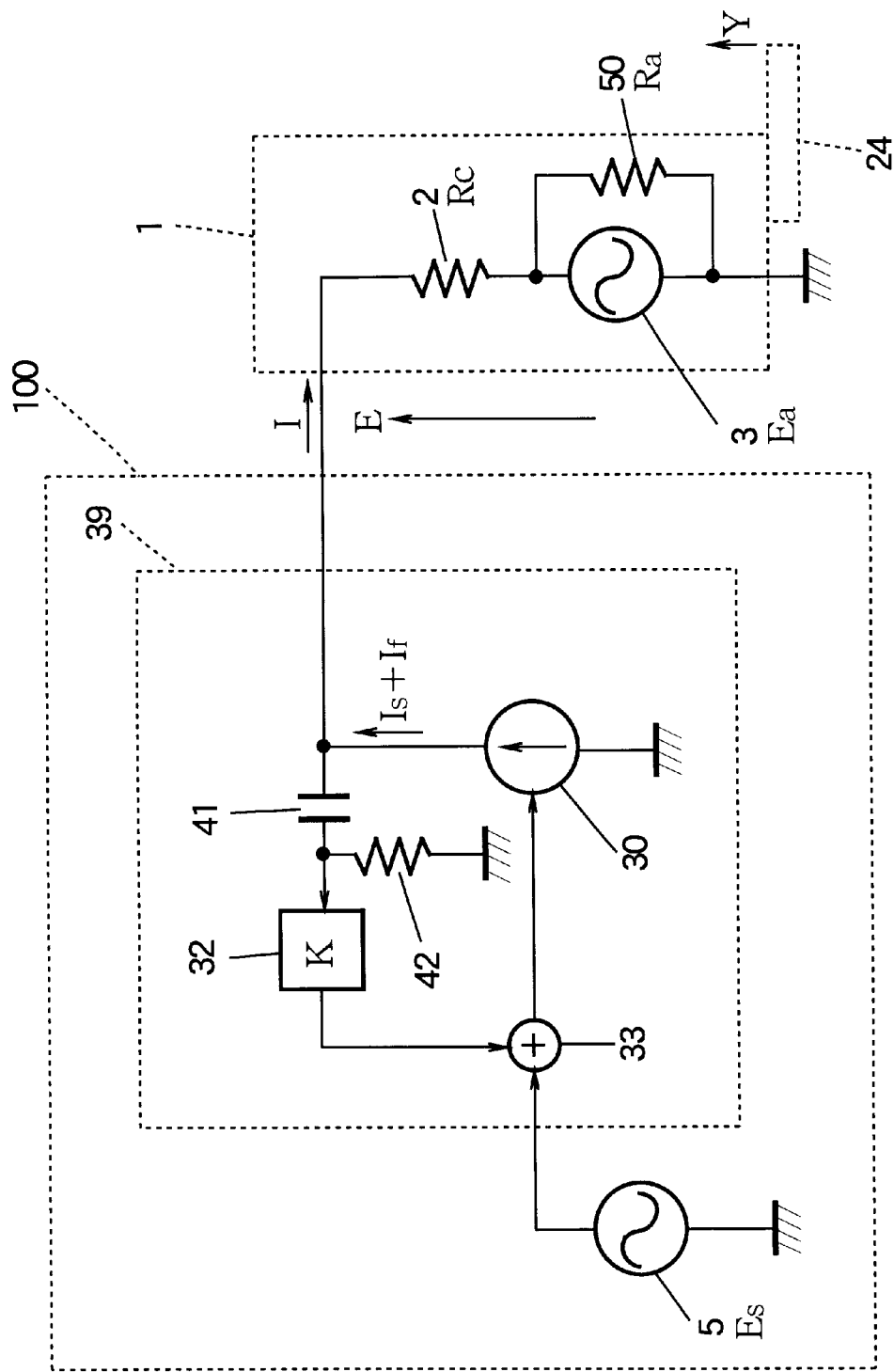
FIG. 8 is a drive circuit diagram of an electromagnetic actuator of a sixth embodiment of the present invention.

FIG. 8 is a circuit diagram of a sixth embodiment of the present invention. This drive circuit 100 differs from that of FIG. 7 in that, instead of using the current source 31, the output voltage of a high-pass filter, which consists of a capacitor 41 and a resistor 42, is multiplied by a factor K in amplitude by a coefficient multiplier 32, and the resultant voltage is added to the signal voltage $E_s$ of the signal source 5 at an adder 33. The result of this addition is input to a current source 30 so as to control the output of the current source 30, to be the sum of the current value $I_f$ of feedback signal and the signal current $I_s$.

If it is now assumed that the mutual conductance of the current source 30 is $K/R_f$, the terminal current I of the electromagnetic actuator 1 which is controlled by the feedback circuit 39 is also expressed by the aforementioned Eq. 22, it follows that the same advantageous effect as the drive circuit of FIG. 7 is attainable. The coefficient multiplier 32 will be unnecessary if K is set to 1 and, as compared with the drive circuit of FIG. 7, the current source 31 is also unnecessary, so the structure is simple. Therefore, the drive circuit of the electromagnetic actuator in this embodiment can be constructed so that it is both inexpensive and highly reliable.

Seventh Embodiment

With reference to FIGS. 9 through 11B, a description will next be made of an example of video tape recorder (VTR) to which the electromagnetic actuator described above is applied.

Figure 9:
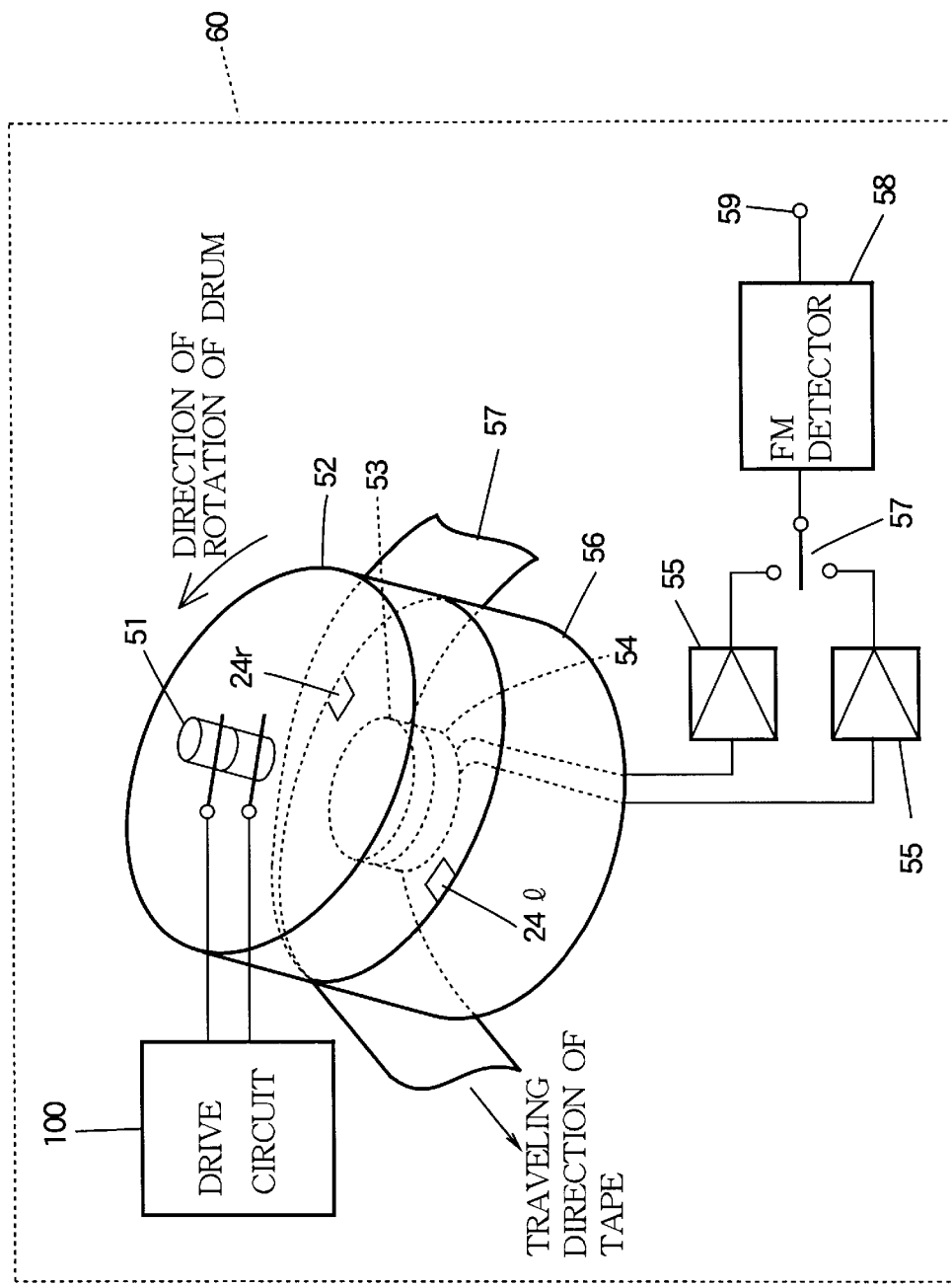
FIG. 9 is a schematic view showing a VTR which is a seventh embodiment of the present invention.

FIG. 9 is a schematic view showing a video tape recorder 60. In the figure, reference numeral 100 denotes the drive circuit described in the first embodiment (see FIG. 3). Reference numeral 51 denotes slip rings for applying the output of the drive circuit 100 to an actuator which rotates. Reference numeral 52 denotes a rotary drum which rotates by 180 degrees for a period of one field. The rotary drum 52 holds a pair of heads 24r and 24l which are each displaced by the actuator 1a of FIG. 1. Reference numeral 53 denotes the rotor of a rotary transformer and reference numeral 54 the stator of the rotary transformer positioned below the rotor. The outputs of the pair of heads 24r and 24l are transmitted to the stator 54 of the rotary transformer and amplified by a pair of amplifiers 55 up to a level where a signal can be processed. Reference numeral 56 denotes a stationary drum, which holds the stator 54. A tape 57 is wound over the rotary drum 52 and the stationary drum 56 by about a little over 180 degrees. As the rotary drum 52 is rotated, the pair of heads 24r and 24l alternately make contact with the tape 57 by 180 degrees at a time. In this way, the information recorded on the tape 57 is reproduced. The output is amplified and supplied to a FM detector 58 through a switch 57. The switch 57 is operated (its connection is changed over) in synchronization with rotation of the drum 52. Thus, the information, read out by the pair of heads 24r and 24l, is selected, detected by the FM detector 58, and output to a terminal 59 as a video signal.

Figure 10:
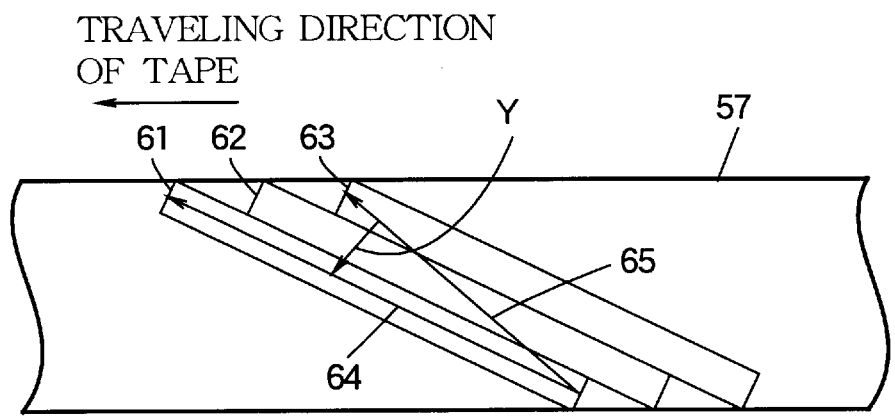
FIG. 10 is a diagram showing a tape track in a noiseless threefold-speed playback operation.

FIG. 10 is a diagram showing tape tracks in a noiseless threefold-speed playback operation. Based on this FIG. 10, the noiseless threefold-speed playback operation in the VTR of FIG. 9 will be described.

Reference numerals 61, 62, and 63 denote the tracks on the tape 57 on which an image of one field is recorded at a standard speed, respectively. An arrow 64 indicates the locus of the head in noiseless image reproduction.

Where a VTR is operated at a normal playback speed, the traveling speed of the tape 57 is the same as the speed during recording, and therefore the locus of the head matches the track, as shown by the arrow 64. However, in the case of a threefold-speed playback, the head locus crosses a plurality of tracks, as shown by an arrow 65. As the head departs from the track, noise is increased and horizontal noise appears on the screen image.

By giving displacement to the head in the Y direction shown in FIG. 10, the locus of the head can be made to match with the arrow 64. In this way, even when a VTR is operated at a threefold speed, the tracks recorded at a normal speed are traced accurately and noiseless threefold-speed playback is realized.

The tape playback speed of the VTR is not limited to a threefold-speed, and even at an arbitrary speed, noiseless high-speed playback can be realized by selecting displacement.

Figure 11A:
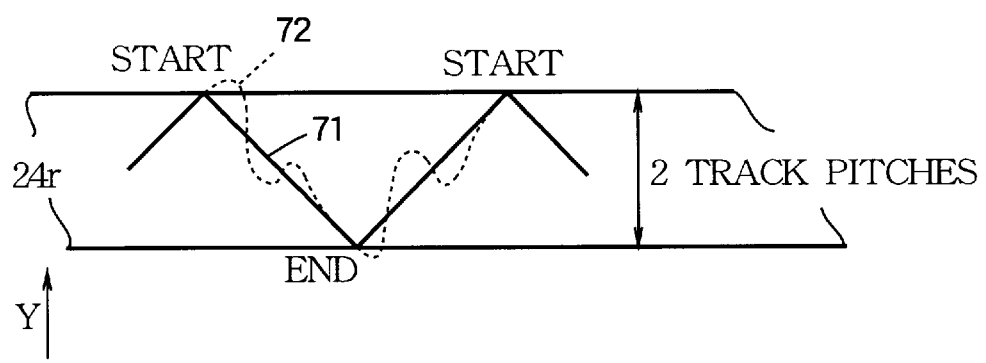
FIGS. 11A and 11B are diagrams showing how a magnetic head is displaced.
Figure 11B:
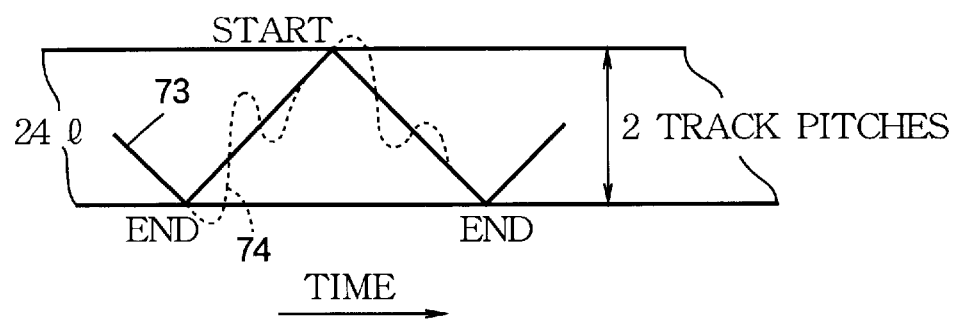

FIG. 11A and FIG. 11B show the displacement Y of the head during threefold-speed noiseless playback.

FIG. 11A shows the displacement of the right head 24r and FIG. 11B shows the displacement of the left head 24l. The horizontal axis represents time. A solid line 71 represents the vibration-free displacement of the right head 24r in the case of threefold-speed playback. If it is assumed that the displacement Y at the track start point is zero, the head needs to be displaced by two track pitches at the track end point. Therefore, the drive circuit 100 controls the position of the head so that it is lowered in proportion to time. In this way one-field tracing is performed. When the tracing operation of one track is completed, the tracing operation by the left head 24l is started and the right head 24r is returned to the original position during the next field.

If the Q factor of the electromagnetic head which controls the position of the head is greater than 0.5 resulting in underdamping, the displacement of the head will be undulated as shown by a broken line 72, while the head is displaced by two track pitches. As a consequence, the head departs from the track and produces playback noise. Likewise, the vibration-free displacement of the left head 24l is represented by a solid line 73 and the vibration displacement is represented by a broken line 74. The same operation as the right head 24r is alternately performed one field at a time.

In this embodiment, by selecting the Q factor to 0.5 resulting in critical damping, the vibration-free displacement of the head can be realized and noiseless threefold-speed playback is possible.

Instead of the drive circuit of the first embodiment, the drive circuits of the second through the sixth embodiments may be used as the aforementioned drive circuit 100 of the VTR, and yet the same advantageous effect is attainable.

Eighth Embodiment

Figure 12:
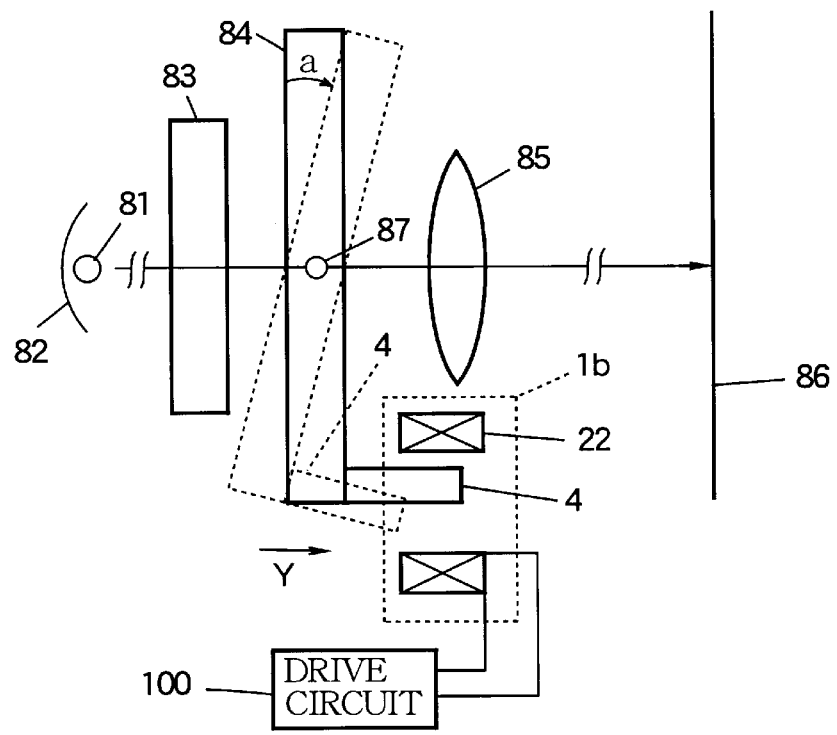
FIG. 12 is a diagrammatic view showing the vertical auxiliary deflecting means of an image display which is an eighth embodiment of the present invention.
Figure 13:
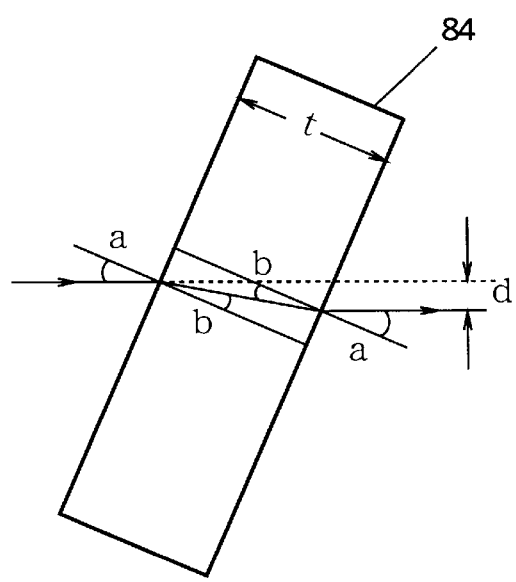
FIG. 13 is a diagram showing an optical path in the image display of FIG. 12.

With reference to FIGS. 12 through 14, a description will next be made of an example of a projection image display such as a liquid crystal projector to which the electromagnetic actuator of the present invention is applied.

FIG. 12 shows an example of a liquid crystal projector. In this projector an electromagnetic actuator is used as a means for controlling the angular displacement of a transparent plate disposed in front of an image display in order to perform vertical auxiliary deflection, realizing a function of doubling the number of visual scanning lines.

The details of the function of doubling the number of scanning lines is disclosed, for example, in Japan Laid-Open Patent Publication No. 7-113998. A description will be made of the control operation of the electromagnetic actuator in the case where the doubling function is realized by the moving-magnet type electromagnetic actuator of FIG. 2.

Referring to FIG. 12, the light emitted by a lamp 81 is irradiated on a liquid crystal panel 83 directly or having been reflected by a reflecting mirror 82. The image light, displayed on the liquid crystal panel 83, passes through a transparent plate, such as a glass plate 84 and is projected onto a screen 86 by a lens 85. The glass plate 84 is constructed so as to be rotatable on an axis 87. The displacement Y of the glass plate 84 is given by the moving-magnet type electromagnetic actuator 1b of FIG. 2, which in turn is driven by the drive circuit 100. The glass plate 84 is moved up to a predetermined position.

FIG. 13 shows the glass plate 84 rotated by an angle a. This position corresponds to the position of the glass plate 84 shown by a dotted line in FIG. 12. The optical path of light horizontally incident on the glass plate 84 having a thickness t inclined by an angle a is shown by a solid-line arrow. The light horizontally incident on the glass plate 84 is refracted so that its path within the glass plate 84 is at an angle b. If the index of refraction of the glass plate 84 is represented by n, the following Eq. 25 is established.

$$\sin a = n \sin b \qquad (25)$$

When light emerges from the glass plate 84 of thickness t, the light is lowered by a value d and is parallel to incident light. The value d is expressed by Eq. 26.

$$d = t(\tan a - \tan b)\cos a \qquad (26)$$

Figure 14A:
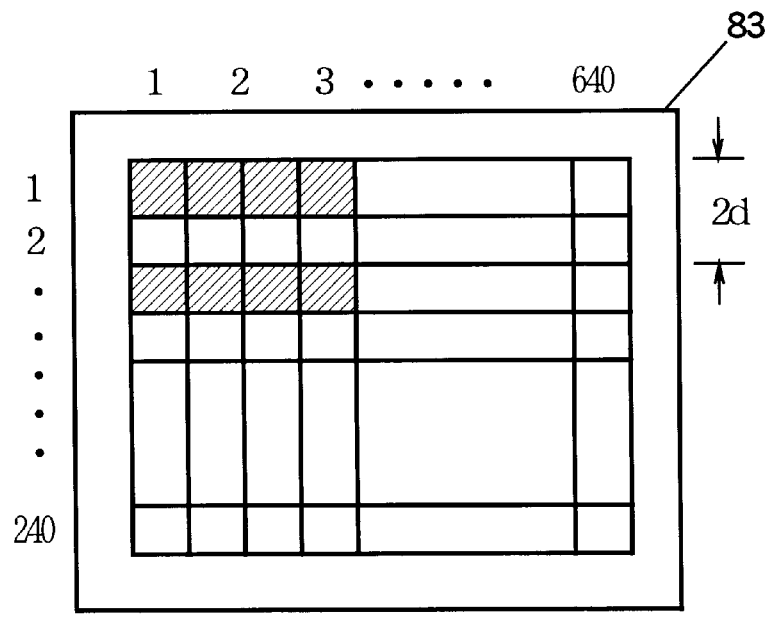
FIG. 14A and FIG. 14B are diagrams showing the pixel arrangement and the displayed image state in the image display of FIG. 12.
Figure 14B:
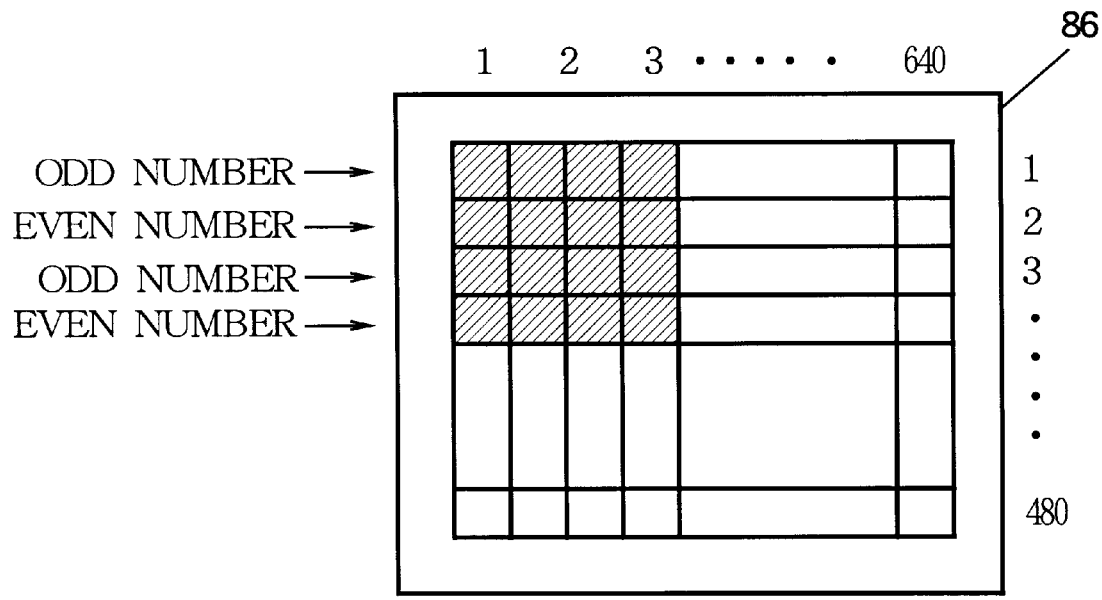
Figure 15:
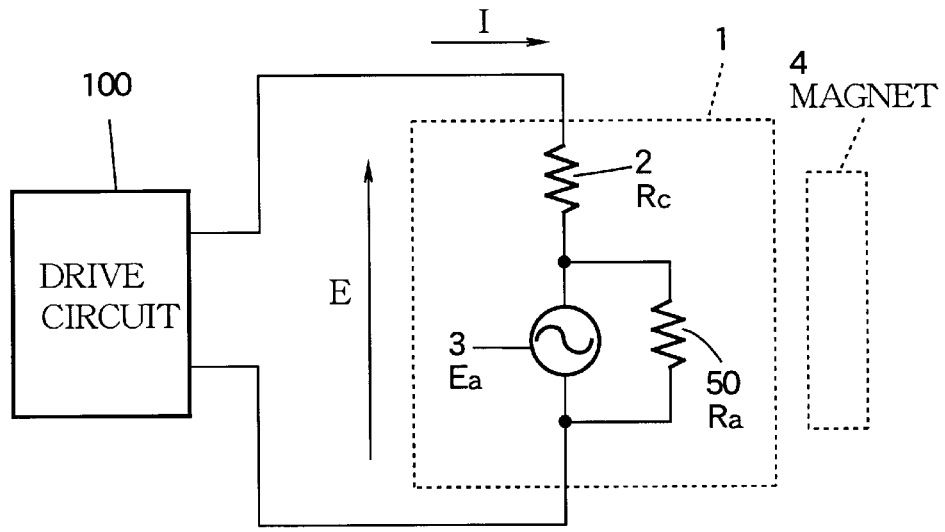
FIG. 15 is a circuit diagram showing the equivalent circuit of a conventional electromagnetic actuator.
Figure 16:
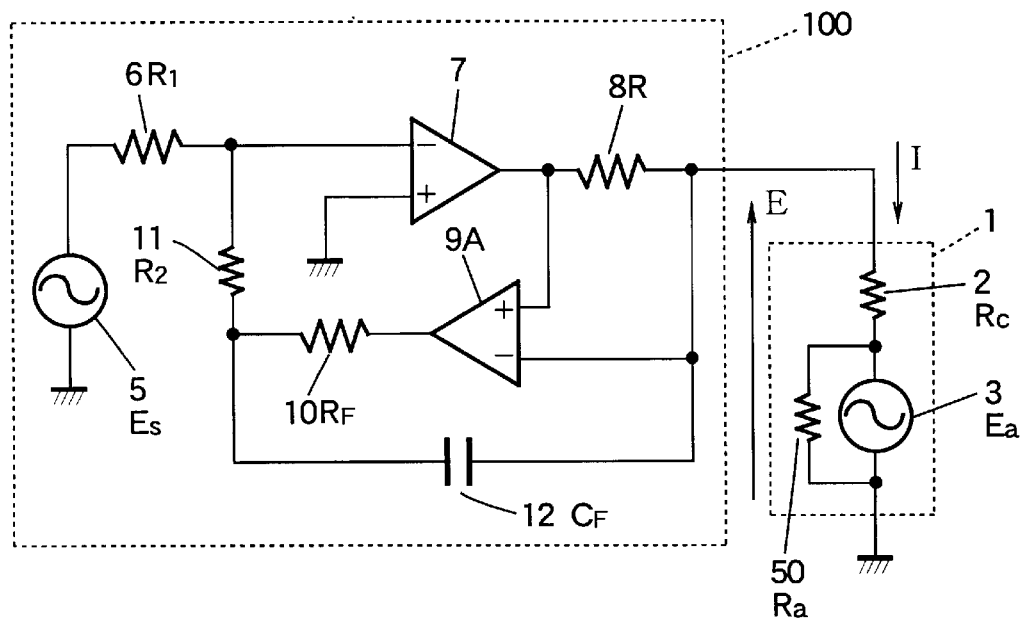
FIG. 16 is a circuit diagram showing an example of a conventional electromagnetic actuator drive circuit.

In FIG. 14A there is shown the pixel structure of the liquid crystal panel 83. A square part, shown by hatching, is a pixel. 240 dots are disposed in the vertical direction and 640 dots are disposed in the horizontal direction. The panel 83 displays an image not in an interlaced state, but in a pairing state. The glass plate 84 is controlled so that it holds its vertical position during a period of odd numbered fields and is inclined by an angle a during a period of even numbered fields. Therefore, an image at an even field is projected on the screen 86 at a position lower than an image at an odd field by a value d. Then, if the value d is set to ½ of the vertical pitch of the pixel, an image which is obtained on the screen 86 through the glass plate 84 will be displayed by an interlaced scanning method using 480 dots, as shown in FIG. 14B.

If the damping of the glass plate 84 by the electromagnetic actuator 1b is insufficient, both an odd field image and an even filed image will vibrate in the vertical direction and an improvement in the pairing state will be impeded. However, since the electromagnetic actuator of the present invention can rotate the glass plate 84 without vibration at critical damping, the interlacing effect is sufficiently obtained, so imaging display with a high definition can be realized.

Any of the aforementioned first through sixth embodiments is used as the drive circuit 100 which drives the electromagnetic actuator 1b, and yet the same advantageous effect is attainable. The glass plate 84 may be controlled by the moving-coil type electromagnetic actuator 1a shown in FIG. 1.

While the invention has been described with reference to preferred embodiments thereof, this should not be taken to limit the scope of the invention.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An electromagnetic actuator drive circuit for controlling a drive current of an electromagnetic actuator in accordance with a signal from a signal source, a displacement of the electromagnetic actuator being displaced in accordance with the drive current, said drive circuit comprising:

a drive-current control circuit for controlling the drive current of the electromagnetic actuator in accordance with the signal from the signal source;

feedback control means for controlling the drive current by negative feedback of a terminal voltage of the electromagnetic actuator and by positive feedback of a terminal current of the electromagnetic actuator, said feedback control means including a current detector detecting a terminal current of the electromagnetic actuator and outputting a voltage indicative of the terminal current, and a subtractive signal synthesizer operatively connected to said current detector, said subtractive signal synthesizer subtracting a terminal voltage of the electromagnetic actuator from the voltage indicative of the terminal current to produce a synthesized signal; and a first current source operatively connected to said subtractive signal synthesizer and converting the synthesized signal to a feedback signal, wherein the feedback signal is fed back into the drive current.

2. The drive circuit as set forth in claim 1, wherein the drive circuit is set to satisfy a relation:

$$O < (H-1) \times R_f < R_c$$

where H represents a current-to-voltage conversion sensitivity for determining a positive feedback quantity based on the terminal current, $R_f$ represents a reciprocal of a mutual conductance of said first current source and determines a negative feedback quantity based on the terminal voltage, and $R_c$ represents a resistance value of a coil of the electromagnetic actuator.

3. The drive circuit as set forth in claim 1, wherein said drive-current control circuit includes a second current source whose current is determined in accordance with the signal from the signal source, and wherein said first current source is connected in parallel with said second current source.

4. The drive circuit as set forth in claim 1, wherein said drive-current control circuit includes said first current source, and said feedback control means further including means for controlling the current of said first current source in accordance with the signal from the signal source and the feedback signal.

5. The drive circuit as set forth in claim 1, wherein the signal source is a displacement signal for a magnetic head of a video tape recorder, and a position of the head is controlled by the electromagnetic actuator.

6. The drive circuit as set forth in claim 1, wherein the signal source is an angular displacement signal for a transparent plate disposed in front of a liquid crystal panel, and a position of the transparent plate is controlled by the electromagnetic actuator.

7. A method of controlling a drive current of an electromagnetic actuator, a displacement of the electromagnetic actuator being displaced in accordance with the drive current, the method comprising:

controlling the drive current of the electromagnetic actuator in accordance with a signal from a signal source; and feedback controlling the drive current by negative feedback of a terminal voltage of the electromagnetic actuator and by positive feedback of a terminal current of the electromagnetic actuator, said feedback controlling including detecting a terminal current of the electromagnetic actuator and outputting a voltage indicative of the terminal current, subtracting a terminal voltage of the electromagnetic actuator from the voltage indicative of the terminal current to produce a synthesized signal, and converting the synthesized signal to a feedback signal with a first current source, wherein the feedback signal is fed back into the drive current.

8. The method as set forth in claim 7, wherein said controlling the drive-current step includes producing a second current in accordance with the signal from the signal source, and wherein said converting step outputs the feedback signal in parallel with the second current output from said controlling the drive-current step.

9. The method as set forth in claim 7, wherein said feedback controlling step further includes controlling a current output by said converting step in accordance with the signal from the signal source and the feedback signal.

10. The method as set forth in claim 7, wherein the signal source is a displacement signal for a magnetic head of a video tape recorder, the method further comprising:

controlling a position of the magnetic head with the electromagnetic actuator.

11. The method as set forth in claim 7, wherein the signal source is an angular displacement signal for a transparent plate disposed in front of a liquid crystal panel, the method further comprising:

controlling a position of the transparent plate with the electromagnetic actuator.

* * * * *